UNITED STATES PATENT OFFICE.

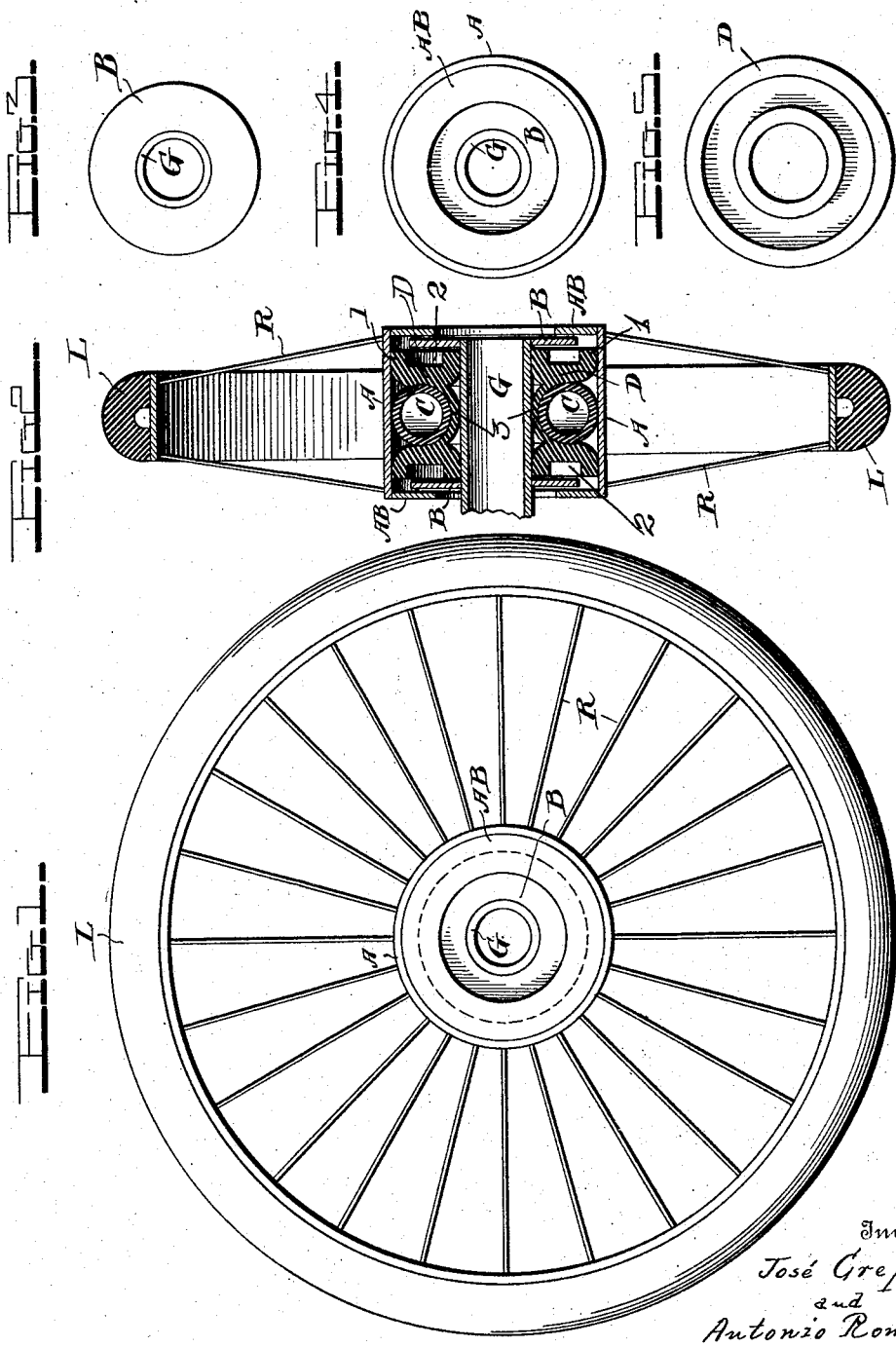

JOSE GREPPI AND ANTONIO ROMANACH, OF BUENOS AIRES, ARGENTINA.

PNEUMATIC WHEEL.

1,183,727.  Specification of Letters Patent.  Patented May 16, 1916.

Application filed February 21, 1916. Serial No. 79,688.

*To all whom it may concern:*

Be it known that we, JOSE GREPPI, a subject of the King of Italy, and ANTONIO ROMANACH, citizen of Argentina, both residing at No. 1411 Sarmiento street, Buenos Aires, Argentina, have invented certain new and useful Improvements in Pneumatic Wheels, of which the following is a specification.

The present invention refers to a new pneumatic wheel for all classes of vehicles, especially automobiles, carts and the like, and has for its object the production of a wheel in which the pneumatic tire as at present used is completely eliminated and substituted by a solid tire of rubber, iron or other suitable substance, and in which a pneumatic cushion is placed in the hub of the wheel, with lateral disks adjusted perpendicularly to the axle.

In order that the invention may be understood and readily utilized, it is illustrated in the attached drawings.

Figure 1 is a side view of a wheel constructed in accordance with the present invention. Fig. 2 is a cross-section of the same. Figs. 3, 4, and 5 are detailed drawings, in projection, of the disks, axle, bush, and pneumatic cushion.

In all the figures the same letters indicate similar or corresponding parts. A cylindrical bushing G is adapted to fit the axle, not shown, and affixed to the outer surface of the bushing and at the ends thereof are two steel disks B. Disks AB are affixed at their outer peripheral edges to a cylindrical cover or hub A, the disks AB having the disks B interposed therebetween. In the space between the bushing G and the cylindrical cover or hub A is placed a resilient member D made of rubber of appropriate thickness (one or two centimeters or more) and of variable diameter, containing an air chamber C.

The spokes R of the wheel are attached to the outer circumference of the hub and may be of wire, wood or other substance and of any suitable shape.

The resilient member D is provided with two annular flanges 1, which are provided with recesses 2 in the outer faces thereof. A web 3 is located between and connects the two flanges 1 together. The tubular air chamber C, which is preferably of rubber, is mounted on the web 3 and between the flanges 1 for maintaining the air chamber in position. The recesses 2 of the flanges permit the flanges to be compressed and accommodating the air chamber when compressed. The object of the disks B and AB is to minimize or neutralize the shaking of the vehicle by means of the friction produced between them and also to prevent the separation of the pieces, thus maintaining the rigidity of the whole wheel.

As is clearly shown in the drawings, the resilient member D is inclosed concentrically in the hub and revolves with it by the motion of the wheel. The result of this arrangement is the avoidance of wear, heating, and injury from blows to which pneumatic tires fixed on the rim of the wheel in contact with the ground are exposed. In the present case the resilient member is not subjected to friction and moreover, owing to its elasticity, neutralizes the shaking of the wheel in relation to the axle of the vehicle, giving a much better result than do tires affixed in the manner known up to the present.

The thickness of the rubber forming the resilient member should be in proportion to the heaviest weight the vehicle will be called upon to carry, and its movement inside the hub is vertical owing to the action of the series of disks AB, B which prevent its lateral displacement.

The extremities of the spokes R are attached to the rim of the wheel, which may be of metal or of solid rubber L as shown in the drawing.

The resilient member may vary in shape according to the degree of elasticity and strength required, and may be circular, oval, flat, etc., as the case may be. Further, if desired, two or more pneumatic cushions may be placed in the hub in order to obtain greater security and strength.

Claims:—

1. In a pneumatic wheel, the combination with a bushing and a hub, of a resilient member interposed between the bushing and hub, and consisting of annular flanges and a connecting web, a tubular air chamber mounted on the web and between the flanges for maintaining it in position, and means carried by the bushing and hub for maintaining the resilient member and air chamber in position.

2. In a pneumatic wheel, the combination with a bushing and a hub, of a resilient member interposed between the bushing and hub, and consisting of annular flanges and a connecting web, said flanges having recesses in the sides thereof to permit of a compression of the flanges, a tubular air chamber mounted on the web and between the flanges for maintaining it in position, and disks on the bushing and hub for maintaining the resilient member and air chamber in place.

In testimony whereof we affix our signatures.

JOSE GREPPI.
ANTONIO ROMANACH.